(12) United States Patent
Dunn

(10) Patent No.: US 11,834,986 B2
(45) Date of Patent: *Dec. 5, 2023

(54) SEMI-CLOSED CYCLE WITH TURBO MEMBRANE O2 SOURCE

(71) Applicant: Enhanced Energy Group LLC, W. Kingston, RI (US)

(72) Inventor: Paul M. Dunn, West Kingston, RI (US)

(73) Assignee: Enhanced Energy Group LLC., West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,105

(22) Filed: Jun. 27, 2022

(65) Prior Publication Data

US 2022/0325663 A1 Oct. 13, 2022

Related U.S. Application Data

(63) Continuation of application No. 16/715,371, filed on Dec. 16, 2019, now Pat. No. 11,371,429.

(Continued)

(51) Int. Cl.
*F02C 3/34* (2006.01)
*F01K 23/10* (2006.01)
(Continued)

(52) U.S. Cl.
CPC .............. *F02C 3/34* (2013.01); *F01K 23/10* (2013.01); *B01D 53/047* (2013.01);
(Continued)

(58) Field of Classification Search
CPC ............ B01D 2256/12; B01D 2256/22; B01D 2257/102; B01D 2257/504;
(Continued)

(56) References Cited

U.S. PATENT DOCUMENTS 5,233,837 A * 8/1993 Callahan ............... C01B 21/045
60/648
6,945,029 B2 * 9/2005 Viteri .................... F01K 25/005
60/39.55

(Continued)

FOREIGN PATENT DOCUMENTS

CA 2521010 C 10/2004
CN 102091500 6/2011
(Continued)

OTHER PUBLICATIONS

European Search Report for Int'l. Patent Appln. No. 19895806.8 dated Aug. 3, 2022 (11 pgs).

(Continued)

*Primary Examiner* — Jesse S Bogue

(57) ABSTRACT

Disclosed is an improved method and system of operating the semi-closed cycle, which both reduces parasitic loads for oxygen generation and for gas clean up, while also reducing, capital cost of the gas clean up plant (reduced drying requirement) and of the oxygen plant (enabling membranes vs. mole sieves). The invention is applicable to piston or turbine engines, and results in a near fully non-emissive power system via the Semi-Closed Cycle (SCC), in a manner which both captures carbon in the form of carbon dioxide, CO2, and in a manner which improves the efficiency and cost effectiveness of prior disclosures. The captured carbon is of a purity and pressure directly suitable for Enhanced Oil Recovery (EOR), sequestration, or industrial use.

20 Claims, 3 Drawing Sheets

Related U.S. Application Data

(60) Provisional application No. 62/779,533, filed on Dec. 14, 2018.

(51) Int. Cl.
  *B01D 53/047* (2006.01)
  *F01N 5/02* (2006.01)
  *F02C 6/18* (2006.01)

(52) U.S. Cl.
  CPC .... *B01D 2256/12* (2013.01); *B01D 2257/102* (2013.01); *B01D 2257/504* (2013.01); *F01N 5/02* (2013.01); *F01N 2240/02* (2013.01); *F02C 6/18* (2013.01); *F05D 2260/61* (2013.01)

(58) Field of Classification Search
  CPC ............................ B01D 2258/01; B01D 53/04; B01D 53/0462; B01D 53/047; B01D 53/0476; B01D 53/22; B01D 53/261; C01B 13/0251; C01B 13/0259; C01B 32/50; F01K 23/10; F01N 2240/02; F01N 5/02; F02C 3/34; F02C 6/18; F05D 2260/61; Y02P 20/129
  See application file for complete search history.

(56) References Cited

U.S. PATENT DOCUMENTS

| | | | | |
|---|---|---|---|---|
| 9,194,340 | B2* | 11/2015 | Dunn | .................. C01B 13/0259 |
| 11,111,847 | B2* | 9/2021 | Dunn | .................. C01B 13/0259 |
| 11,371,429 | B2 | 6/2022 | Dunn | |
| 2002/0023423 | A1 | 2/2002 | Viteri et al. | |
| 2010/0116132 | A1 | 5/2010 | Staiger et al. | |
| 2010/0242728 | A1 | 9/2010 | Radosz et al. | |
| 2014/0060013 | A1 | 3/2014 | Dunn | |
| 2018/0334957 | A1* | 11/2018 | Kriegel | .................. F01K 23/10 |
| 2020/0271050 | A1 | 8/2020 | Dunn | |
| 2020/0381757 | A1* | 12/2020 | Jia | .......................... B01D 53/04 |

FOREIGN PATENT DOCUMENTS

| | | |
|---|---|---|
| CN | 103026031 | 4/2013 |
| CN | 103442783 A | 12/2013 |
| CN | 103764254 B | 4/2014 |
| CN | 104781531 | 7/2015 |
| CN | 105980666 | 9/2016 |
| WO | 9008932 W | 8/1990 |
| WO | 2016160563 A1 | 10/2016 |

OTHER PUBLICATIONS

Lei M. et al: "Thermal Swing Adsorption Process for Carbon Dioxide Capture and Recovery: Modeling, Simulation, Parameters Estimability, and Identification", Industrial & Engineering Chemistry Research, vol. 52, No. 22, May 20, 2013 (May 20, 2013), pp. 7526-7533, XP55946027, ISSN: 0888-5885, DOI: 10.1021/ie3029152.

Chinese Patent Office First Office Action Search Report for China Patent Appln. No. 201980092238.2, dated Mar. 24, 2023 (3 pgs).
Chinese Search Report for Chinese Patent Appln. No.201980092238.2, dated Aug. 14, 2023 (3 pgs).

* cited by examiner

SEMI-CLOSED CYCLE WITH TURBO MEMBRANE O2 SOURCE

CROSS-REFERENCE TO RELATED APPLICATIONS

This application is a continuation of and claims the benefit of priority to U.S. Nonprovisional patent application Ser. No. 16/715,371, filed on Dec. 16, 2019 (now U.S. Pat. No. 11,371,429), which claims the benefit of priority to U.S. Provisional Patent Application No. 62/779,533, filed on Dec. 14, 2018, the contents of which are incorporated herein by reference in their entireties.

BACKGROUND

1. Field of Use

This invention generally relates to semi-closed cycle power systems and more particularly power systems including carbon capture equipment or at least having concentrated exhaust CO2 levels, enabling lower cost CO2 capture equipment to be employed. Furthermore, this invention relates to oxygen plants, in particular membrane oxygen plants, with a corresponding method to reduce the specific power of those plants and make them competitive with Vacuum Pressure Swing Adsorption (VPSA) oxygen plants.

2. Description of Prior Art (Background)

Conventional power systems, whether internal or external combustion, burn fuel with air and generally vent the untreated combustion products (exhaust/flue gas) to the air (or via underwater interface to the air). This is true of natural gas, gasoline, and diesel piston engines, and also of gas turbines, jet engines, or even steam boiler based power plants.

Emissions of the untreated flue gas to the air, while simple to execute, is not desirable for environmental reasons. Gases such as SO2, NOx, CO, HC (unburned hydro carbon) and more recently CO2 are defined as pollutants and emissions are regulated. In addition, for special purpose applications, in particular for undersea applications, the requirement to tie the system exhaust pressure to the ambient pressure (elevated backpressure) can lower engine cycle efficiency significantly.

Historically, prior work on various closed or semi-closed power systems (in the first part of the 1900's) was mostly related to special purpose applications. More recently prior work is mostly about the ability to provide higher efficiency and/or effectively control emissions or even capture system emissions, in particular CO2. U.S. Pat. No. 9,194,340 B2, also by this inventor, provides the history and citation of relevant patents.

At first, due to unavailability of conventional fuels, as a result of isolation, poverty, or war, and later from a desire to use renewable fuels, there has been a vast array of tinkering, research, patents, and commercialization of pyrolysis and gasification systems which, mostly via high temperature thermal decomposition, break down an available feed stock or fuel (coal, solid waste, wood waste, paper, plastic) which cannot be, or is not easily burned in an engine, into at least one component, generally a synthesis gas, that is easily burned in an engine.

Pyrolysis and gasification systems generally fall into two categories: continuous feed machines, or batch (autoclave) type machines. The preferred machine will depend on the feedstock and to a large degree whether that feedstock can be effectively transported by conveyor, screw or other means into the reaction zone; where possible, the continuous feed type machine is preferred. U.S. Pat. No. 8,784,616 B2, with parent and child patents, provides a thorough set of citations to over a dozen patent and non-patent documents in this area.

PCT/US2018/000163, disclosed a method to integrate and improve upon the pyrolysis techniques, and to reduce oxygen'levels in the exhaust of the semi-closed cycle (SCC), which improved metrics, and enabled a carbon negative power system.

3. Motivation to Improve the State of the Art

The existing semi-closed cycle power systems and related prior art are encumbered with a significant operational penalty. The oxygen plant, discussed in the prior art literature, is frequently the highest operational cost of the power system and consumes a significant portion of the net power produced. Furthermore, low backpressure of the power system results in a large fraction of water vapor in the exhaust, which complicates engine operation, while also complicating gas cleanup system requirements, since the raw CO2 stream must be dehydrated.

Additionally, the gas clean up system, when mole sieve based, requires a high horsepower blower to increase exhaust pressure to a level where the mole sieves are effective (for Thermal Swing Adsorption (TSA), Pressure Swing Adsorption (PSA), or Vacuum Pressure Swing Adsorption (VPSA) processes). Finally, the TSA process requires a significant quantity of hot dry gas to regenerate the absorption beds.

As can be seen from the prior art, there is a further desire for power systems to become non-emissive and/or to have less of an adverse environmental impact.

BRIEF SUMMARY

The invention is directed towards: 1) improving the efficiency of the semi-closed cycle process, consuming less of the produced power to operate auxiliary systems, 2) reducing the capital cost of oxygen generation (nitrogen removal) systems, 3) reducing the compression power associated with a membrane oxygen plant, making it competitive if not better than a VPSA oxygen plant, 4) reducing the size, complexity, and parasitic power associated with the CO2 gas cleanup system of the semi-closed cycle.

BRIEF DESCRIPTION OF'THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
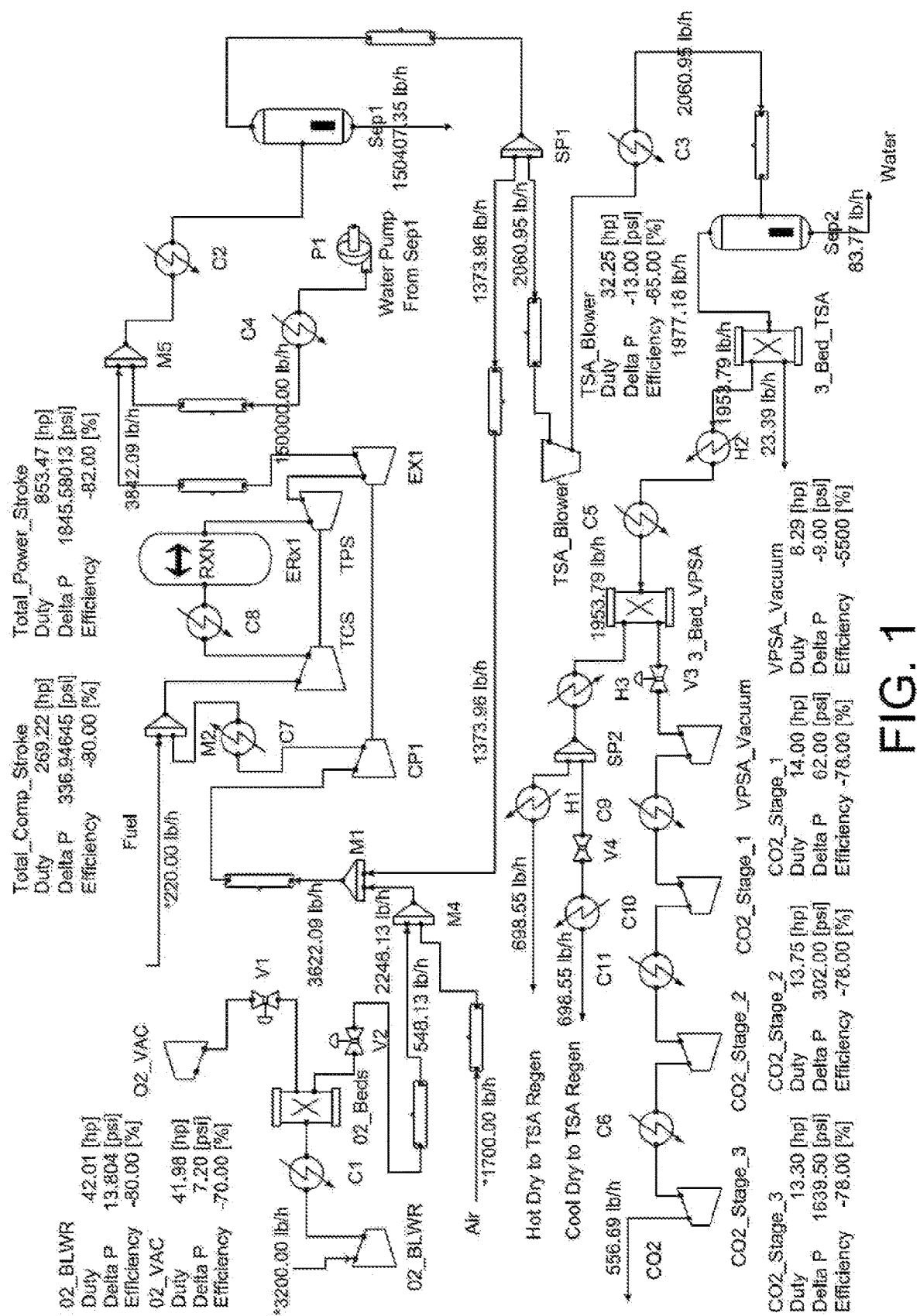
FIG. 1 (prior art) is a simulation flow sheet of a nominally 400 kW, ~600 hp, piston engine, running on the semi-closed cycle, with VPSA based oxygen generation and molecular sieve based gas cleanup system.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used, herein are not intended to be limiting but rather to provide an understandable description of the invention.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be understood that, as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The present invention generally relates to a system of operating a compression ignition, spark ignition, rich or lean burn reciprocating piston engine, or lean burn gas turbine, in a semi-closed cycle, in a manner which is non-emissive, and which produces products, to include CO2 at pressure and power, optionally while processing its own fuel or a fuel for others via pyrolysis.

CO2 at pressure is required for a process. Enhanced Oil Recovery is an example of such a process. It is further to be appreciated that the system of the present invention is applicable to two stroke or four stroke piston engines, rich or lean burn, rotary piston engines, or small gas turbines.

Medium speed engines (which have greater time for the combustion process), and especially engines tolerant of operation at high "boost" (intake manifold) net mean effective pressure (such as medium speed two stroke engines or heavy duty low to medium speed four stroke engines) are suited to the cycle but the invention is not to be understood to be limited to such medium speed engines.

Turning now descriptively to the drawings, in which similar reference characters denote similar elements throughout the several views.

FIG. 1 schematically illustrates the basic components of a generic SCC power system, including N2 removal (oxygen plant), gas cleanup system (GCS), and product compression. Referring to FIG. 1, the components O2_VAC, O2_BLWR, O2_Beds, and associated heat exchangers and valves leading up to mixer M4 represent a simplified view of a VPSA Oxygen Plant. As is disclosed in PCT/US2018/000163 and other prior art, air is compressed, and flows through the beds (typically 2 or 3) which adsorb nitrogen, CO2, water, and other contaminants, resulting in an oxygen argon mixture, typically 88-93% oxygen, balance argon and nitrogen. Periodically the bed is loaded in nitrogen, which is then removed via vacuum, with purging of some of the product oxygen.

As shown in FIG. 1, about 6.5 tons per day of O2 product, at 88% purity, is delivered to mixer M4, with a total mechanical parasitic load of about 84 hp. This high purity oxygen is mixed with air, to generate a 35.5% purity oxygen, nitrogen, argon mixture at the discharge of M4.

Components between CP1 and EX1 represent the engine. CP1 is the turbo charger compressor, which delivers about 15 psia of boost pressure (30 psia); C7 is the aftercooler, which cools hot compressor exhaust to 300 F; M2 represents the mixing of fuel and working fluid that occurs typically in the intake manifold; compressor TCS represents the sum of the total compression strokes of the piston engine (or compressor of the gas turbine), with C8 representing the heat loss in that portion of the engine; ERx1 represents the combustion, modeling chemical equilibrium and additional heat loss; and TPS and EX1 represent the total power stroke and turbo charger turbine work. This simulation accurately predicts the exhaust temperature (from the turbo charger) and engine port (turbo charger inlet) exhaust temperature for a particular rich burn turbo charged natural gas piston engine.

It is recognized that while a piston engine example was modeled herein, the gross exhaust constituents, semi-closed cycle methods, and gas cleanup and oxygen generation requirements apply equally to small industrial gas turbines, with similar exhaust temperatures.

As has been discussed in the prior art, water is sprayed into the exhaust at M5, and separated at Sep1, resulting in cooled exhaust (~110 F) which is circulated back to the engine inlet via M1. The exhaust mixes with the nominally 35% O2 from the VPSA/Air mixer M4 to produce 21-22% oxygen for the engine, or lower levels for the lean burn or gas turbine engines, generally 15-20%. This method of engine operation effectively almost doubles or more the exhaust CO2 concentration, enabling cost effective carbon capture.

The GCS includes the components starting at SP1, and ending with the final stage of CO2 compression at CO2_Stage_3, via the 3_Bed_TSA, which dehydrates the exhaust, and 3_Bed_VPSA, which captures the purified CO2.

It should be noted that, excluding CO2 compression, the net power of the engine, nominally 600 hp, has been reduced by the O2 plant loads, of 84 hp, and TSA blower load, of 32 hp. It should be further noted that significant heat loads exist which burden the system, to include the blower discharge heat exchanger, C3; TSA discharge heat exchanger, C5; and the heat associated with regeneration of the TSA beds. Typically, a chiller, and useful capture of the exhaust waste heat from the engine is employed to service these heating and cooling requirements. For example, a chiller sized for this system is about 30 tons, and further reduces engine net output power by ~40 hp.

Figure 2:
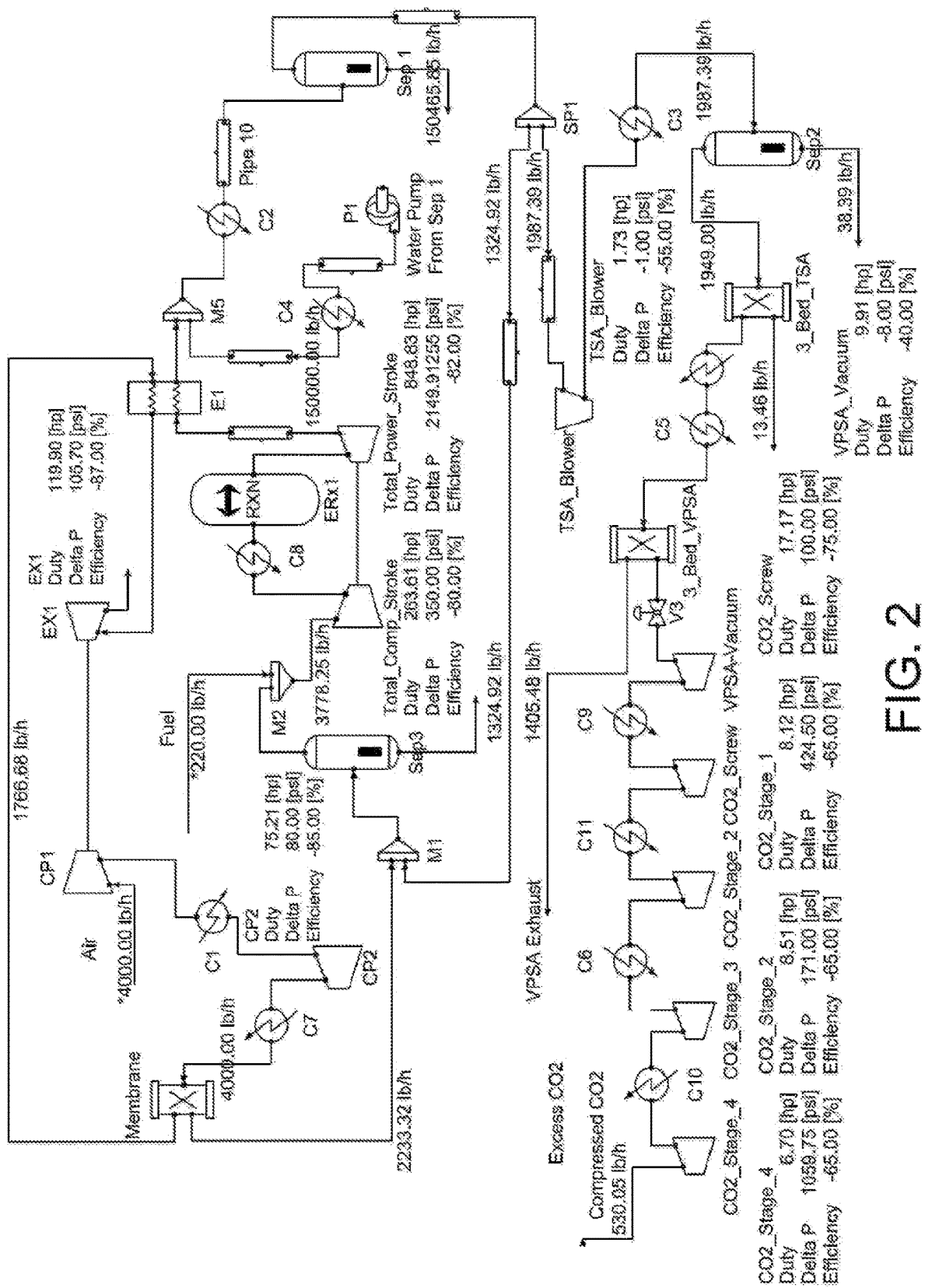
FIG. 2, is a simulation flow sheet of the same nominally 400 kW, ~600 hp, piston engine, running on the semi-closed cycle, with a membrane based oxygen generation system, and special features of this invention which will be discussed herein.

FIG. 2 schematically illustrates the basic components of the improved SCC power system, including N2 removal (oxygen plant), gas cleanup system (GCS), and product compression. Referring to FIG. 2, the components O2_VAC, O2_BLWR, O2_Beds, and associated items from FIG. 1 have been removed and are replaced with a membrane oxygen generator.

Membrane oxygen generation systems are commercially available, and lower cost than VPSA O2 plants. However, the membrane plant requires more air flow, at higher pressure, to produce the same oxygen content, and produce that oxygen content at lower purity. As shown herein, the membrane is receiving air at 132 psia (117 psia) and 4000 lb/hr, compared to 14 psia and 3200 lbm/hr of the VPSA in FIG. 1. As a result, the compression power required for the membrane is normally too high for this application and would be over 200 hp if that were provided conventionally.

The membrane disclosed herein operates via selective membrane elements, which pass "fast gases" like oxygen, CO2, and water, while not passing much nitrogen or argon. The membrane receives air at 132 psia, and produces 122 psia dry nitrogen, at 95% purity at one discharge port (1766 lbin/hr). The other port, the permeate side (2233 lbm/hr), is lower pressure, m this instance 30 psia, and is 35% oxygen, As before, the flow at M1, at 22% mixed O2 purity, is ~3600 lb/hr, which is what the engine needs to operate, the difference is that it is now at ~30 psia, not atmospheric pressure. As a result, the engine turbo charger and aftercooler have been removed, and the engine receives the working fluid at the required pressure, and at a slightly lower temperature (107 F) which improves performance and reduces knock.

The engine exhaust pressure, at what would have been turbo charger turbine inlet, is actually slightly higher than with the turbo charger, but is still consistent with the engine capability. Engine mass flow and exhaust port temperature are slightly higher than with the turbocharger and VPSA based O2 plant, but not significantly.

The hot exhaust now flows via a new component, a counter flow heat exchanger, E1, before going through the balance of SCC and GCS equipment as before.

Going back to the membrane plant, the membrane requires 132 psia of air, at 4000 lb/hr. Rather than use a single oil flooded screw compressor, there is what looks like a turbo charger compressor, CP1, which is functioning as a first stage compressor prior to the screw. This component is consuming 120 hp to provide the air at 55 psia to C1, which cools it back to 110 F. This reduces the power required at CP2 from ~200 hp to 75 hp. Thus, the CP2 compressor requirement for the membrane Oxygen source is now less than the prior art power requirement for the VPS A oxygen source.

The high pressure dry nitrogen side of the membrane output is heated via counterflow heat exchanger E1, and is expanded via a turbo charger like expander, EX1, which is directly coupled to CP1. In effect, removing the engine turbo charger, and instead turbo charge the membrane, while still meeting the engine requirements for compressed working fluid. The pressure drop across EX1 is higher than a typical turbo charger, at 105 psi. EX1 could be a two stage turbo charger expander, driving a one or two stage compressor. It is also possible to reheat between EX1 stage 1 and stage 2, which would further improve the metrics.

The SCC pressure, at SP1, is now at engine boost pressure, of 30 psia vs. 14.7 psia. Thus, the water vapor concentration is reduced, from 8.6% to 4.3%. This will reduce the size of the beds at 3_Bed_TSA.

More significantly, the TSA blower power, which was 32 hp, is now essentially zero hp. The simulation shows it at 2 hp, but in fact the blower is really operating here as a control mechanism for the recirculation flow, and could be replaced with a valve.

Finally, the exhaust from the EX1 expander is still hot enough, 650 F, and dry enough (−40 dew point) to regenerate the TSA beds, without requiring additional components.

The net power is this example, excluding the CO2 compression is improved by ~40 hp. In addition, the water loads, which drive the chiller requirements, are significantly reduced.

Figure 3:
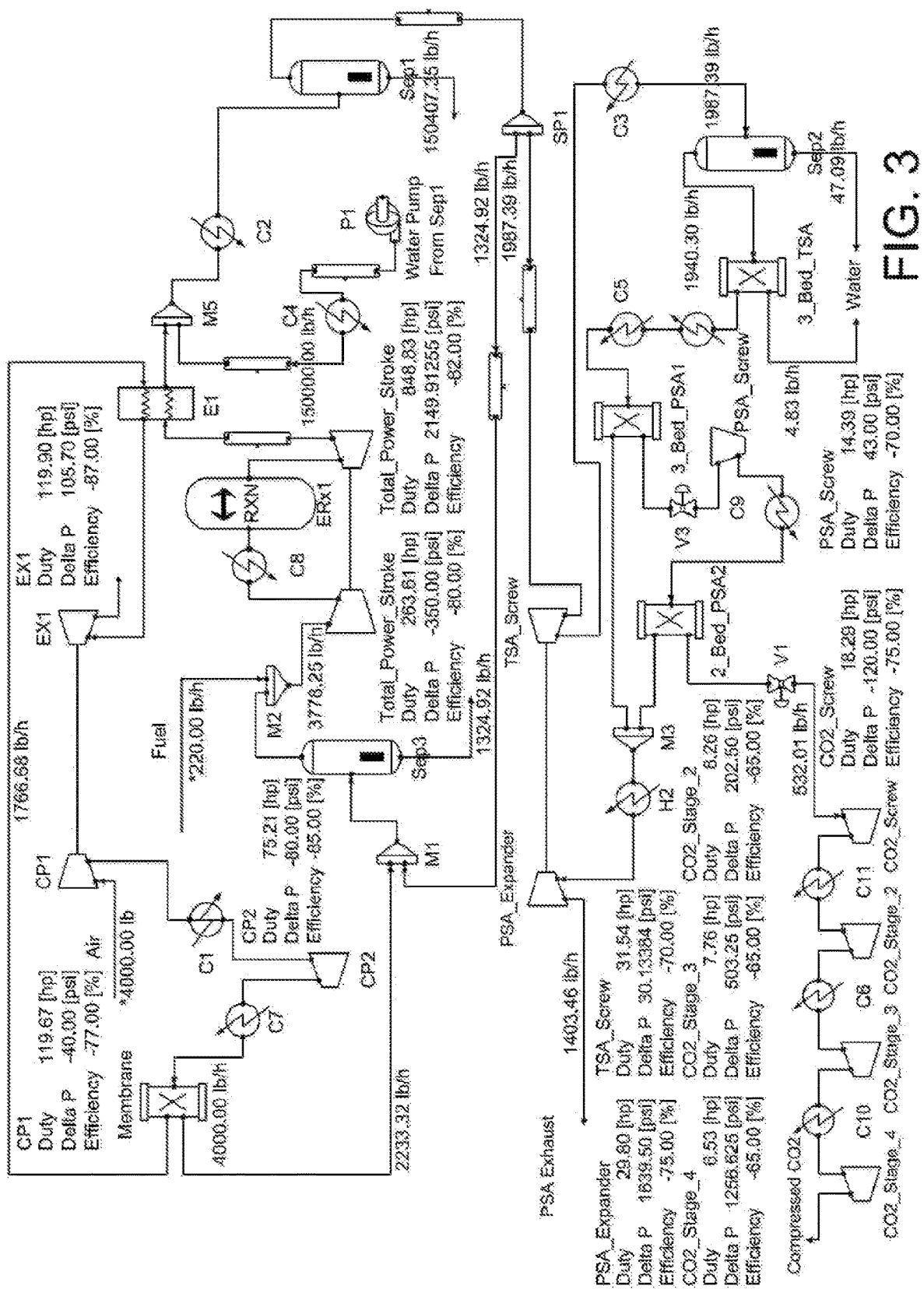
FIG. 3, is a simulation flow sheet of the same system as FIG. 2, but with a two page PSA vs. single stage VPSA CO2 capture and gas cleanup system following TSA dehydration.

Referring to FIG. 3, the same system as FIG. 2 is depicted, with all of the improvements associated with the membrane O2 source. Also as before, the pressure at SP1 is now 30 psia, due to the fact that the system is operating at what was the turbo charger boost pressure of the engine. As a result of the higher pressure, it is now possible to use a PSA vs. VPSA capture methodology, in this instance with two stages, without significant power penalty.

Again referring to FIG. 3, the TSA Blower of FIG. 2 is now replaced by a TSA Screw Compressor, which consumes approximately 30 hp to provide 30 psi pressure difference. The higher pressure results in greater water removal via Separator Sep2, enabling a two bed TSA for final dehydration. The dehydrated exhaust continues via Cooler C5 to a three bed PSA, for the first stage of CO2 capture.

In this instance, the customer CO2 purity requirements are higher, and a second Two bed PSA is used for additional purification, fed by Compressor PSA Screw and Cooler C9. Whether or not the second stage PSA is used, the discharge from one PSA or two PSA are combined (when two are pressure via mixer M3, and are heated via H2. This heated pressurized gas, at this point a mixture of N2, O2, and Argon, produces sufficient power at expander PSA Expander to cover most of or all of the loads at TSA Screw. These components could be directly coupled, as is indicated, like in a turbo charger, or the expander could generate electricity to offset the powering requirements of TSA Screw. In either instance the power needs associated with PSA gas capture purification, which are generally higher than with VPSA capture, have been reduced to zero for the single stage PSA, or to 14 hp for the two stage PSA, which is not much higher than the system of FIG. 2, but which would deliver markedly better CO2 purity, enabling broader applications.

For sequestration purposes, the VPSA based capture of FIG. 2, or the first stage of the PSA capture from FIG. 3, would generally be sufficient. For pipeline or other higher purity CO2 requirements, a two stage PSA capture system would provide greater purity, and offers additional flexibility to capture certain pollutants, such as NOx, by using a different media in the first stage PSA than in the second stage PSA.

Finally, in both the VPSA capture of FIG. 2 and the PSA capture of FIG. 3, the cycle times on the TSA dehydration beds are many hours. In the example shown, the two bed TSA would cycle every 8 hours or so, and heating would be required about 50% of the time. The PSA or VPSA beds of FIGS. 2 and 3 cycle in minutes. In the three bed PSA or VPSA, two beds are cycling, and one bed is offline. When that heat is not used for the TSA regeneration, it can be used to thermally regenerate one of the three beds in the three bed PSA/VPSA. In this way, the degradation of the media due to contaminant buildup, for example from. NOx, can be reduced or eliminated, while at the same time periodic maintenance (downtime) to manually regenerate the PSA beds is eliminated.

What is claimed is:

1. A semi-closed cycle power system, comprising:
   an engine;
   a membrane based oxygen plant;
   a mixing vessel configured to mix oxygen and cooled exhaust gas to create an artificial atmosphere working fluid for the engine;
   an exhaust water separator;
   a molecular sieve based dehydration unit;
   a molecular sieve based capture unit;
   an exhaust counter flow heat exchanger;
   a compressor configured to provide air to the membrane based oxygen plant; and
   a shaft coupled expander to expand nitrogen from the exhaust counter flow heat exchanger to drive the compressor.

2. The semi-closed cycle power system of claim 1, wherein the molecular sieve based dehydration unit is configured to operate on a Thermal Swing Absorption (TSA) process, wherein engine exhaust waste heat regenerates one of a plurality of TSA beds.

3. The semi-closed cycle power system of claim 2, wherein the molecular sieve based capture unit is configured to operate on at least one of a Vacuum Pressure Swing Absorption (VPSA) process or a Pressure Swing Absorption (PSA) process, wherein heat from the at least one of the VPSA process or the PSA process regenerates one of the plurality of TSA beds.

4. The semi-closed cycle power system of claim 1, wherein the air provided to the membrane based oxygen plant, by the compressor, is configured to be at a pressure greater than the engine turbo charger compressor output pressure.

5. The semi-closed cycle power system of claim 1, wherein the engine is configured to operate at engine boost pressure, and
   wherein a permeate side, of the membrane based oxygen plant, is configured to operate:
      at a pressure that is higher than the engine boost pressure at that time.

6. The semi-closed cycle power system of claim 1, further comprising a plurality of TSA beds,
   wherein the engine is configured to operate at engine boost pressure, and
   wherein a semi-closed cycle pressure, upstream of the plurality of TSA beds, is equivalent to the engine boost pressure at that time.

7. A system, comprising:
   an engine configured to operate at engine boost pressure, wherein the engine comprises an aftercooler;
   a membrane based oxygen plant,
      wherein a permeate side, of the membrane based oxygen plant, is configured to operate:
         at a pressure that is higher than the engine boost pressure at that time, and
         at a temperature lower than an aftercooler discharge temperature at that time;
   a mixing vessel configured to mix oxygen and cooled exhaust gas to create an artificial atmosphere working fluid for the engine;
   an exhaust water separator;
   a molecular sieve based dehydration unit; and
   a molecular sieve based capture unit.

8. The system of claim 7, wherein the molecular sieve based dehydration unit is configured to operate on a Thermal Swing Absorption (TSA) process, wherein engine exhaust waste heat regenerates one of a plurality of TSA beds.

9. The system of claim 8, wherein the molecular sieve based capture unit is configured to operate on at least one of a Vacuum Pressure Swing Absorption (VPSA) process or a Pressure Swing Absorption (PSA) process, wherein heat from the at least one of the VPSA process or the PSA process regenerates one of the plurality of TSA beds.

10. The system of claim 7, further comprising a plurality of TSA beds,
    wherein a system pressure, upstream of the plurality of TSA beds, is equivalent to the engine boost pressure at that time.

11. The system of claim 7, further comprising:
    an exhaust counter flow heat exchanger;
    a compressor configured to provide air to the membrane based oxygen plant; and
    a shaft coupled expander to expand nitrogen from the exhaust counter flow heat exchanger to drive the compressor.

12. The system of claim 11, wherein the air provided to the membrane based oxygen plant, by the compressor, is configured to be about equal to engine turbo charger output pressure.

13. A system, comprising:
    an engine configured to operate at engine boost pressure;
    a membrane based oxygen plant,
       wherein a permeate side, of the membrane based oxygen plant, is configured to operate:
          at a pressure that is higher than the engine boost pressure at that time;
    a mixing vessel configured to mix oxygen and cooled exhaust gas to create an artificial atmosphere working fluid for the engine;
    an exhaust water separator;

a molecular sieve based dehydration unit; and a molecular sieve based capture unit, wherein a semi-closed cycle pressure, upstream of a plurality of TSA beds, is equivalent to the engine boost pressure, and wherein the semi-closed cycle pressure being equivalent to the engine boost pressure reduces a necessary size of one or more of the plurality of TSA beds.

14. The system of claim 13, wherein the molecular sieve based dehydration unit is configured to operate on a Thermal Swing Absorption (TSA) process, wherein engine exhaust waste heat regenerates one of the plurality of TSA beds.

15. The system of claim 13, wherein the molecular sieve based capture unit is configured to operate on at least one of a Vacuum Pressure Swing Absorption (VPSA) process or a Pressure Swing Absorption (PSA) process, wherein heat from the at least one of the VPSA process or the PSA process regenerates one of the plurality of TSA beds.

16. The system of claim 13, further comprising:

an exhaust counter flow heat exchanger;

a compressor configured to provide air to the membrane based oxygen plant; and a shaft coupled expander to expand nitrogen from the exhaust counter flow heat exchanger to drive the compressor.

17. The system of claim 16, wherein the air provided to the membrane based oxygen plant, by the compressor, is configured to be about equal to engine turbo charger output pressure.

18. The system of claim 16, wherein the compressor is configured to deliver about 15 pounds per square inch gauge (psig) of boost pressure.

19. The system of claim 16, further comprising a PSA capture process, wherein processed gas is expanded, via an expander, to power a TSA blower.

20. The system of claim 19, wherein the PSA capture process comprises a single stage or two stages.

* * * * *